(12) United States Patent
Schmidt

(10) Patent No.: US 12,358,615 B2
(45) Date of Patent: Jul. 15, 2025

(54) PYROTECHNIC WHEEL ACCELERATION SYSTEM

(71) Applicant: SAFRAN LANDING SYSTEMS CANADA INC., Ajax (CA)

(72) Inventor: Robert Kyle Schmidt, Brooklin (CA)

(73) Assignee: Safran Landing Systems Canada Inc., Ajax (CA)

( * ) Notice: Subject to any disclaimer, the term of this patent is extended or adjusted under 35 U.S.C. 154(b) by 118 days.

(21) Appl. No.: 17/160,202

(22) Filed: Jan. 27, 2021

(65) Prior Publication Data
US 2022/0234726 A1    Jul. 28, 2022

(51) Int. Cl.
B64C 25/32    (2006.01)

(52) U.S. Cl.
CPC .................................. B64C 25/405 (2013.01)

(58) Field of Classification Search
CPC ............................ B64C 25/405; B64D 27/023
See application file for complete search history.

(56) References Cited

U.S. PATENT DOCUMENTS

| | | | |
|---|---|---|---|
| 2,452,633 A | 11/1948 | Cautley | |
| 2,461,288 A * | 2/1949 | Livermon | ............... B64C 25/40 60/407 |
| 2,467,140 A | 4/1949 | Livermon | |
| 2,468,790 A * | 5/1949 | Suiter | .................... B64C 25/405 244/103 S |
| 2,672,308 A | 3/1954 | Farrell | |
| 4,687,158 A * | 8/1987 | Kettering | ............... B64C 25/001 244/102 R |
| 6,450,448 B1 * | 9/2002 | Suzuki | ................... B64C 25/405 244/103 S |
| 2011/0155846 A1 | 6/2011 | Bulin et al. | |
| 2013/0255618 A1 * | 10/2013 | Hwang | ............. F16F 15/13157 123/192.1 |
| 2015/0283908 A1 * | 10/2015 | Himmelmann | ....... B64C 25/405 290/9 |
| 2015/0314859 A1 | 11/2015 | Blanpain et al. | |
| 2016/0096619 A1 | 4/2016 | Daffos | |
| 2017/0121013 A1 * | 5/2017 | Christensen | ............ B64C 25/42 |

(Continued)

FOREIGN PATENT DOCUMENTS

FR    1017435 A    12/1952

OTHER PUBLICATIONS

J. A. Anderson & C. R. Galasinski, Jet Engine Starters, Cartridge-Pneumatic, Jan. 27, 1967, (Year: 1967).*

(Continued)

*Primary Examiner* — Joshua J Michener
*Assistant Examiner* — Nevena Aleksic
(74) *Attorney, Agent, or Firm* — CHRISTENSEN O'CONNOR JOHNSON KINDNESS PLLC

(57) ABSTRACT

Wheel acceleration systems are disclosed that provide a motive force to at least one wheel of an aircraft, in order to accelerate the aircraft to takeoff speed with the assistance of main engine thrust. The wheel acceleration system includes a pyrotechnic unit configured to generate expanding gases by combusting a propellant, and a rotary propulsion unit pneumatically coupled to the pyrotechnic unit. The rotary propulsion unit includes an impeller configured to be driven by the expanding gases and to deliver torque to the wheel.

19 Claims, 5 Drawing Sheets

(56) References Cited

U.S. PATENT DOCUMENTS

2020/0107976 A1* 4/2020 Groden ............... B64D 17/80
2021/0388768 A1* 12/2021 Jones .................. F02C 7/277

OTHER PUBLICATIONS

Notification of Transmittal of the International Search Report and the Written Opinion of the International Searching Authority, or the Declaration mailed on Mar. 25, 2022, issued in corresponding International Patent Application No. PCT/CA2022/050035, filed on Jan. 11, 2022, 11 pages.

Anderson J.A., and Galasinski C.R., "Jet Engine Starters, Cartridge-Pneumatic", ASME paper 67-GT-49, Contributed by the Gas Turbine Division for presentation at the Gas Turbine Conference and Products Show, Houston, Tex., Mar. 5-9, 1967, of the American Society of Mechanical Engineers. Manuscript received at ASME Headquarters, Jan. 27, 1967, 15 pages.

Supplementary European Search Report mailed Nov. 7, 2024, issued in corresponding European Application No. 22744952.7, filed Jan. 11, 2022, 8 pages.

* cited by examiner

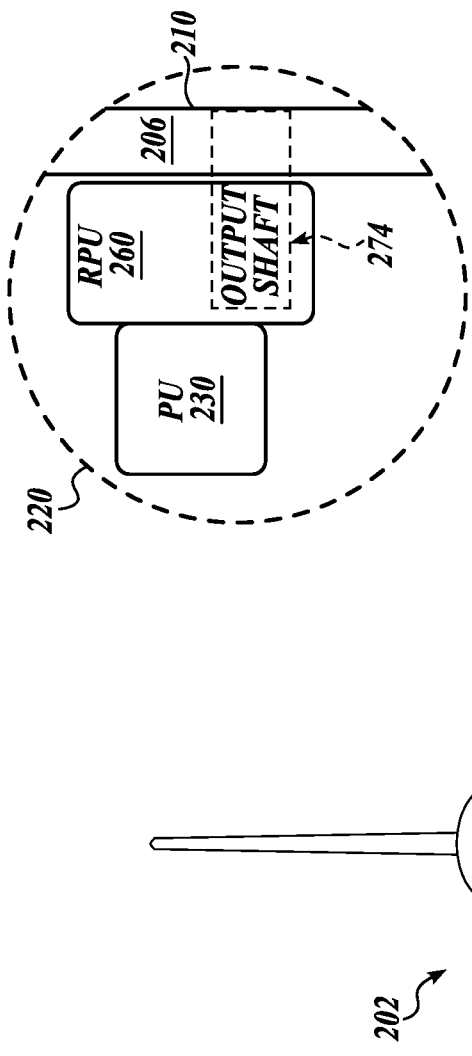
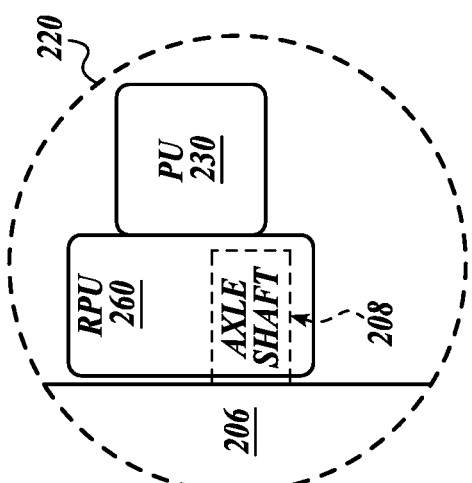
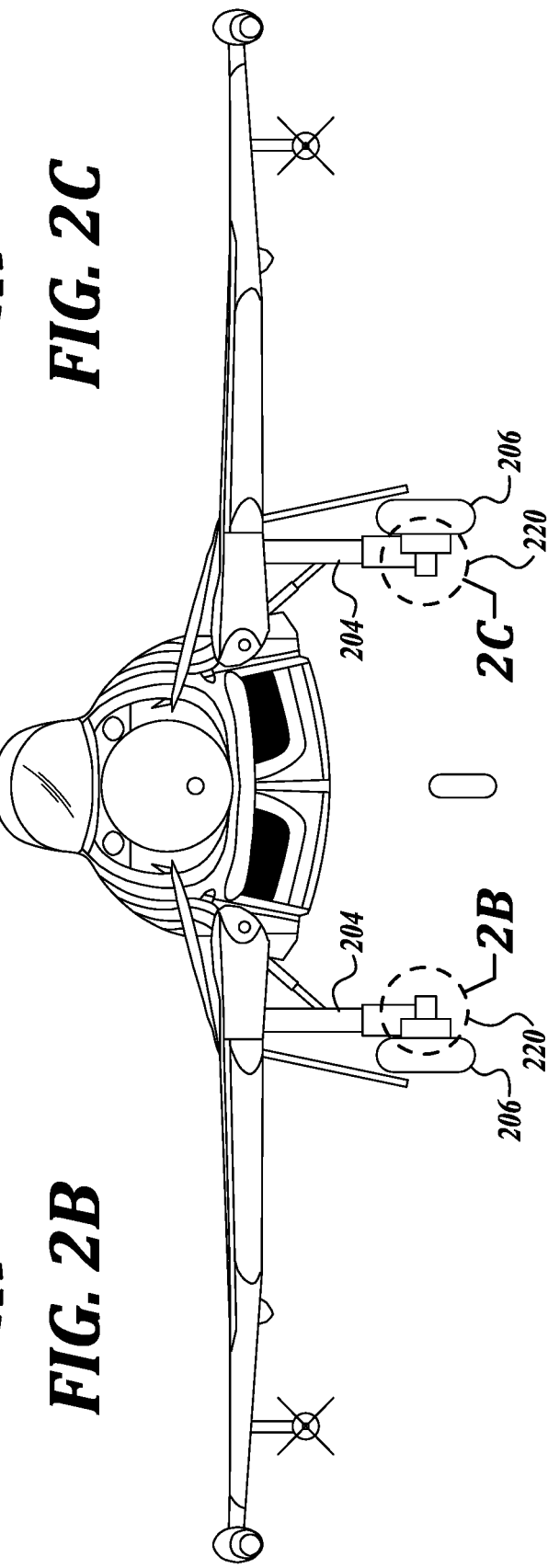
FIG. 2C
FIG. 2B
FIG. 2A

PYROTECHNIC WHEEL ACCELERATION SYSTEM

BACKGROUND

Most aircraft are equipped with landing gear that enables travel on the ground during takeoff, landing, and taxiing phases. These landing gear comprise a plurality of wheels, which may be arranged according to configurations varying from one aircraft to another. For takeoff, aircraft traditionally rely on main engine thrust in order to reach flying speed.

Aircraft with low engine thrust and relatively high overall mass have lengthy takeoff distances, as it takes a long time for the low thrust to accelerate the aircraft to flying speed. Although this combination is often acceptable, for instance with long-endurance aircraft and self-launching gliders, in many cases the long takeoff distance is not desirable. Indeed, there are times when operation from reduced runway lengths is necessary—such as the operation of aircraft from aircraft ship decks or when operating from improvised airfields of limited length. While catapults and other such mechanisms effectively reduce take distance, such solutions are not always available. Thus, a means of reducing the takeoff length is desired.

Wheel drive systems have been proposed to assist with taxiing, and in some cases to assist aircraft with takeoff. One known wheel drive system is set forth in US Patent Publication No. 2015/0314859, and assigned to Safran Landing Systems. Such a system proposes an undercarriage leg supporting an electric drive actuator, which drives rotation of a landing gear wheel via a reduction gearset. Another known electrical drive system is set forth in US Patent Publication No. 2016/0096619, also assigned to Safran Landing Systems. While these systems are well-suited to taxiing applications, they are not suited to the task of quickly accelerating an aircraft to takeoff speeds, except potentially for very lightweight aircraft. For weight and space reasons, such known systems cannot scale in order to deliver the torque and power output necessary to accelerate even modestly sized aircraft from a ship deck or improvised runway, even with the assistance of main engine thrust.

Accordingly, there is a continuing need in the industry for improved techniques of reducing the takeoff length through an aircraft mounted system.

SUMMARY

The present disclosure provides examples of innovative aircraft-mounted wheel acceleration systems that utilize pyrotechnic cartridge-powered rotary propulsion units, which in turn deliver high torque and power output to one or more aircraft wheels, in order to accelerate the aircraft to flying speed in connection with main engine thrust.

In accordance with an aspect of the present disclosure, a wheel acceleration system is provided. The wheel acceleration system is configured to apply a motive force to at least one wheel mounted to a landing gear of an aircraft. The wheel acceleration system includes a pyrotechnic unit configured to generate expanding gases by combusting a propellant, and a rotary propulsion unit pneumatically coupled to the pyrotechnic unit. The rotary propulsion unit includes an impeller configured to be driven by the expanding gases and to deliver torque to the wheel (e.g., to an output shaft coupled to the wheel).

In any of the embodiments described herein, the rotary propulsion unit and/or the pyrotechnic unit is mounted to the landing gear.

In any of the embodiments described herein, the impeller of the rotary propulsion unit is part of a turbine or an expansion vane motor.

In any of the embodiments described herein, the impeller is coupled to the wheel (e.g., coupled to an output shaft of the wheel) via a reduction gearbox.

In any of the embodiments described herein, the rotary propulsion unit is contained within an outer housing configured to be mounted to the landing gear.

In any of the embodiments described herein, the wheel acceleration system can include a clutch coupling the impeller to the wheel (e.g., coupling the impeller to an output shaft to the wheel, or coupling an output shaft to the wheel).

In any of the embodiments described herein, the wheel acceleration system can include a flywheel coupled with rotary propulsion unit (e.g., to an output shaft of the rotary propulsion unit), the flywheel being configured to selectively engage the aircraft wheel.

In any of the embodiments described herein, the pyrotechnic unit and the rotary propulsion unit are contained in a common outer housing.

In any of the embodiments described herein, the pyrotechnic unit comprises a breech configured to receive a pyrotechnic cartridge containing the propellant.

In any of the embodiments described herein, the pyrotechnic cartridge is a pressure vessel and the pyrotechnic unit is configured to jettison the pyrotechnic cartridge by releasing a gas connector that couples the pyrotechnic cartridge to the pyrotechnic unit.

In any of the embodiments described herein, the wheel acceleration system can include a second rotary propulsion unit comprising a second impeller configured to be driven by the expanding gases of the pyrotechnic unit, the second impeller configured to be driven by the expanding gases and to deliver torque to a second wheel of the aircraft (e.g., to a second output shaft of the second wheel).

In any of the embodiments described herein, the pyrotechnic unit is mounted to a fuselage of the aircraft, the rotary propulsion unit is mounted to the landing gear, and the second rotary propulsion unit is mounted to a second landing gear of the aircraft.

In any of the embodiments described herein, the pyrotechnic unit is configured to deliver the expanding gases to the rotary propulsion unit via a first fluid circuit and to the second rotary propulsion unit via a second fluid circuit.

In any of the embodiments described herein, the pyrotechnic unit and the rotary propulsion unit are mounted to a fuselage of the aircraft or to the aircraft landing gear.

In any of the embodiments described herein, the rotary propulsion unit is configured to rotatably drive the wheel and a second wheel of the aircraft with a plurality of drive shaft assemblies.

In any of the embodiments described herein, the rotary propulsion unit is configured to deliver a torque output of at least 1500 Nm to the wheel (e.g., to an output shaft of the wheel).

In any of the embodiments described herein, the rotary propulsion unit is configured to deliver a power output of at least 800 Kilowatts to the wheel (e.g., to an output shaft of the wheel).

In accordance with another aspect of the present disclosure, a landing gear is provided, equipped with at least one wheel acceleration system as described herein.

In accordance with still another aspect of the present disclosure, an aircraft is provided, equipped with at least one wheel acceleration system of the present disclosure.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 2A is a schematic front view of an aircraft equipped with a representative wheel acceleration system in accordance with an embodiment of the present disclosure;

FIG. 2B is a schematic breakout view of an aspect of the wheel acceleration system of FIG. 2A;

FIG. 2C is a schematic breakout view of another aspect of the wheel acceleration system of FIG. 2A;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided as a representative example or illustration and should not be construed as preferred or advantageous over other embodiments. The representative examples provided herein are not intended to be exhaustive or to limit the claimed subject matter to the precise forms disclosed.

Terms such as, but not limited to, "upper," "lower," "inboard," "outboard," "top," "bottom," "side," "vertical," "horizontal," and "lateral" in the present disclosure is meant to provide orientation for the reader with reference to the drawings and is not intended to be the required orientation of the components or to impart orientation limitations into the claims.

The present disclosure relates to aircraft-mounted wheel acceleration systems, in addition to aircraft landing gear systems and aircraft equipped with such wheel acceleration systems. The wheel acceleration systems of the present disclosure are aircraft-mounted systems configured to assist with the acceleration of the aircraft to flying speeds, for example with the assistance of main engine thrust. Restated, the power delivered by the wheel acceleration systems and main engine thrust together accelerate the aircraft to takeoff speeds. Such systems have wide applicability to commercial and military aircraft. Advantageously, such wheel acceleration systems effectively reduce takeoff distance, which can enable aircraft to operate from aircraft ship decks and/or improvised runways.

As will be described below, the wheel acceleration systems of the present disclosure utilize pyrotechnic charges to generate expanding gases, which in turn drive an impeller that delivers high torque and power to at least one wheel of the aircraft, thereby accelerating the aircraft during the takeoff phase. Following takeoff, the wheel acceleration systems may be stowed on the aircraft or at least partially jettisoned in order to reduce "dead weight."

Advantageously, the wheel acceleration systems of the present disclosure provide sufficient power density to accelerate military aircraft to takeoff speeds, without overly penalizing flying weight.

Figure 1A:
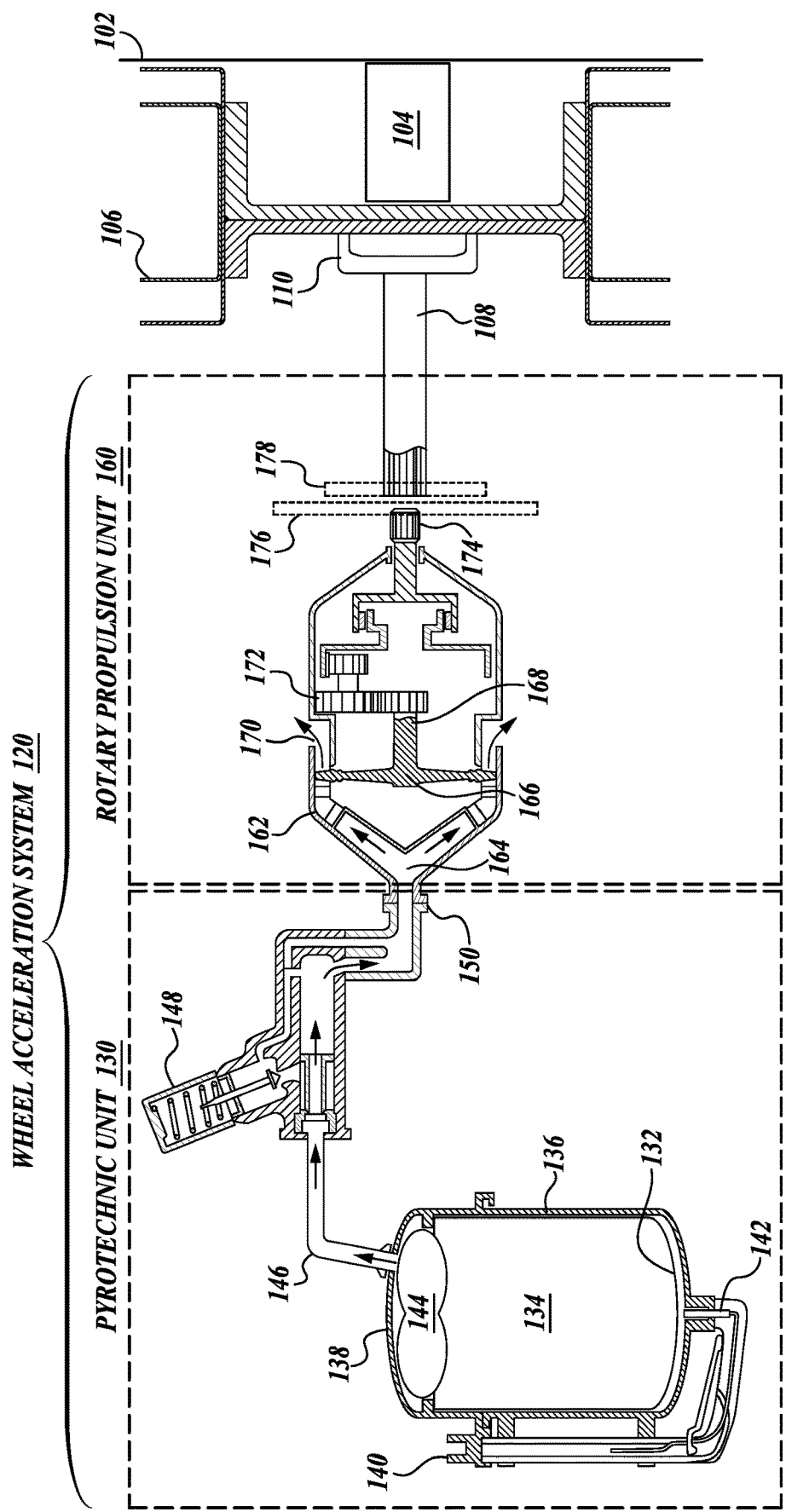
FIG. 1A is a schematic diagram of a representative wheel acceleration system in accordance with an embodiment of the present disclosure.

FIG. 1A is a schematic diagram of an aircraft 102 equipped with a landing gear 104 and a wheel 106. The landing gear 104 may include one or more struts, legs, or the like. The aircraft 102 may be any type of aircraft 102, for example military "fighter" type aircraft having a takeoff weight of 4,000 kg or greater, which are tasked with operating from improvised runways or ship decks. Accordingly, the landing gear 104 and wheel 106 include the landing gear structure and wheels of such aircraft 102, including one or more struts, legs, or the like. In the representative embodiment shown, the landing gear 104 includes a landing gear leg and at least one axle shaft 108. The wheel 106 is mounted upon the axle shaft 108 or may be coupled to the axle shaft 108 by a coupler 110 such that it is configured for rotational movement. As used herein, "aircraft wheel" refers to both the wheel itself and any tire mounted upon the wheel. In one application, the wheels 106 include the rear wheels of such aircraft (e.g., wheels mounted to the wings or a rearward portion of the fuselage), which generally experience greater friction with the runway surface during takeoff, and thus are well-suited to accelerating the aircraft due to greater traction. However, it is contemplated that the wheel acceleration systems of the present disclosure are suitable for use with the front wheels (i.e., wheels attached to a front portion of the fuselage), rather than the rear wheels. It is further contemplated that wheel acceleration systems of the present disclosure may be utilized on the front and/or rear wheels of a tandem-style landing gear, with wheels on a tail-mounted landing gear, with wheels on landing gear having a plurality of bogies, and with any other type of landing gear.

The aircraft 102 is equipped with a representative wheel acceleration system 120 in accordance with an embodiment of the present disclosure, which is configured to apply a motive force to the wheel 106. It is contemplated that in some embodiments, the aircraft 102 is equipped with a plurality of wheel acceleration systems 120. For brevity and clarity, a single wheel acceleration system 120 is described below in connection with FIG. 1A.

The aircraft-mounted wheel acceleration system 120 may be mounted in a number of configurations relative to the aircraft 102. In some embodiments, the wheel acceleration system 120 is mounted at least partially upon the landing gear 104, while in some embodiments, the wheel acceleration system 120 is mounted at least partially upon a fuselage, wing, or other non-landing gear portion of the aircraft 102. Representative mounting configurations are described below with respect to FIGS. 2A-3B.

Referring to FIG. 1A, the wheel acceleration system 120 includes two primary subsystems: a pyrotechnic unit 130 and a rotary propulsion unit 160. As will be described in detail below, the pyrotechnic unit 130 is configured to generate expanding gases by combusting a propellant, whereas the rotary propulsion unit 160 is configured to utilize the expanding gases from the pyrotechnic unit 130 to create rotary motion, and thus to rotatably drive at least the wheel 106. Although FIG. 1A illustrates certain components as forming part of the pyrotechnic unit 130 or the rotary propulsion unit 160, such demarcations are representative, not limiting. In some embodiments, the rotary propulsion unit 160 is configured to drive more than one wheel.

In some embodiments, the pyrotechnic unit 130 is configured to utilize a pyrotechnic cartridge 132, which is separate from the pyrotechnic unit 130 in the illustrated embodiment, but in some embodiments forms part of the pyrotechnic unit 130. The pyrotechnic cartridge 132 includes an outer casing or shell which contains within it a propellant 134, e.g., a solid or liquid fuel. Representative solid propellants include ammonium nitrate-based propellants suspended in a combustible binder. Representative liquid propellants include hyrdrazine, red nitric acid and jet fuel, and the like. Representative pyrotechnic cartridges 132 include MXU-4A and MXU-4A/A starting cartridges, formerly manufactured by Talley Industries, Inc. of Mesa, Arizona Whether the propellant 134 is a solid or liquid fuel, its characteristics (e.g., grain composition, size, concentration, chemistry, and/or distribution) can be adjusted to achieve a desired burn rate, gas volume, gas temperature, and other pyrotechnic performance parameters. In some embodiments, the pyrotechnic cartridge 132 includes an integrated ignitor, e.g., an electro-explosive device (not shown).

A breech 136 may be provided for forming a pressure vessel configured to receive the pyrotechnic cartridge 132, and is selectively sealed by a breech cap 138 (which itself can form part of the breech 136). In the illustrated embodiment, the breech cap 138 can be selectively opened in order to remove and replace the pyrotechnic cartridge 132, e.g., after depletion of the propellant and between flights.

In the illustrated embodiment, the breech 136 is operatively coupled to an electrical connector 140, which is configured to receive an ignition signal, e.g., from a pilot of the aircraft 102, a controller on board the aircraft 102, or remotely. The ignition signal initiates an ignitor 142 (e.g., an electro-explosive device, an electrical ignition device, a firing pin, or the like), which in turn ignites the propellant 134 within the pyrotechnic cartridge 132. This ignition of the propellant 134 causes an exothermic reaction, which generates hot expanding gases 144 within the pressure vessel formed by the breech 136 and breech cap 138. Some embodiments include a mechanical ignitor, either as an alternative or backup to the ignitor 142. Such embodiments include a firing pin or similar mechanical ignition device disposed on or proximal to the breech 136.

Fluid circuit 146 channels the expanding gases from the breech 136 to the rotary propulsion unit 160. Depending on the mounting location of the pyrotechnic unit 130, the fluid circuit 146 can have different forms. For example, in embodiments in which the pyrotechnic unit 130 and rotary propulsion unit 160 have a fixed relative location (e.g., both are mounted on the aircraft landing gear as in FIG. 2A or both located centrally on the fuselage of the aircraft as in FIG. 3B), the fluid circuit 146 can be a fixed/rigid fluid circuit. In other embodiments in which the relative positions of the pyrotechnic unit 130 and the rotary propulsion unit 160 vary during takeoff or flight, the fluid circuit 146 is a flexible fluid circuit. Such flexible fluid circuit advantageously enables relative movement of the rotary propulsion unit 160 and the pyrotechnic unit 130, e.g., in embodiments in which the pyrotechnic unit 130 is located centrally on the aircraft fuselage and the rotary propulsion unit 160 is located on the landing gear 104 (as in FIG. 3A). Representative fluid circuit 146 includes high temperature-resistant flexible exhaust ducting, rigid exhaust fluid circuit, articulating exhaust joints, and the like. Although the fluid circuit 146 is shown as part of the pyrotechnic unit 130 in FIG. 1A, it may at least partially form part of the rotary propulsion unit 160 in some embodiments.

A relief valve 148 is fitted to the fluid circuit 146 and configured to vent any excess gases produced by the pyrotechnic cartridge 132 which cannot be consumed by the rotary propulsion unit 160 (as described below). In the illustrated embodiment, the relief valve 148 is positioned upstream of an optional gas connector 150 (e.g., a flanged exhaust fitting) which pneumatically connects the fluid circuit 146 to the rotary propulsion unit 160. However, in some embodiments, the relief valve 148 and gas connector 150 have different relative positions. For example, in some embodiments, the relief valve 148 is located downstream of the gas connector 150; in such embodiments, the relief valve 148 and at least a portion of the fluid circuit 146 form part of the rotary propulsion unit 160. As another example, the gas connector 150 is disposed at an upstream end of the fluid circuit 146 (e.g., where the fluid circuit 146 meets the breech 136 or breech cap 138; accordingly, the relief valve 148 is also disposed downstream of the fluid circuit 146 in such embodiments.

The rotary propulsion unit 160 connects with the pyrotechnic unit 130 via the fluid circuit 146, e.g. at the gas connector 150. As noted above, the rotary propulsion unit 160 is configured to utilize the expanding gases 144 from the pyrotechnic unit 130 to create rotary motion, and thus to rotatably drive the wheel 106. That is, the rotary propulsion unit 160 utilizes, for example, an expansion vane motor, a turbine, or similar rotary motor to create torque to drive the wheel 106.

Still referring to FIG. 1A, the rotary propulsion unit 160 is housed within an outer housing 162 configured for mounting upon the landing gear 104 or the fuselage, wing, or other part of the aircraft 102. In one representative embodiment, the outer housing 162 includes one or more brackets, fasteners, and the like configured to secure the rotary propulsion unit 160 to a leg, strut, fuselage, wing, or other part of the aircraft 102.

The outer housing 162 has a gas inlet 164 in fluid communication with the fluid circuit 146 and configured to receive the expanding gases 144. The outer housing 162 rotatably supports at least one impeller 166 therein, the vanes of which are acted upon by the expanding gases 144, which causes the impeller 166 to rotate its impeller shaft 168, ultimately delivering torque to the wheel 106 and accelerating the aircraft 102. The spent gases exit the outer housing 162 through one or more gas outlets 170.

In an embodiment, the impeller 166 is part of an expansion vane motor, i.e., a pneumatic motor wherein the impeller 166 comprises a rotor and a plurality of expansion vanes housed within an eccentric stator. The expansion vanes expand and contract radially in order to follow the internal eccentricity of the stator. Consequently, the expanding vane surface offsets declining gas pressure within the stator, causing substantially uniform force delivery along an intake arc about the impeller shaft 168. One advantageous feature of vane motors is relatively high torque delivery at low speeds. These features make the expansion vane motor well-suited to delivering relatively high starting torque to the impeller shaft 168.

One representative expansion vane motor that can be practiced with embodiments of the present disclosure is described in SAE Technical Paper No. 861714, which is hereby incorporated by reference. See Dusenberry, G. and Carlson, D., "Development of a Hot Gas Vane Motor for Aircraft Starting Systems," SAE Technical Paper 861714, 1986, https://doi.org/10.4271/861714. Other representative pneumatic expansion vane motors that may be employed include the LZL Vane Air Motors manufactured by Atlas Copco Tools and Assembly Systems LLC of Auburn Hills, MI Expansion vane motors may be utilized in all embodiments of the wheel acceleration system 120, including those having an optional reduction gearbox, flywheel and/or clutch, as described below. In another embodiment, the impeller 166 is a turbine having fixed vane dimensions. Such turbines are well-suited to high-speed/low-torque applications, and may be utilized in all embodiments of the wheel acceleration system 120, including those having an optional reduction gearbox, flywheel and/or clutch, as described below.

The rotary propulsion unit 160 of FIG. 1A is shown with a number of optional features which may be disposed within the outer housing 162 and utilized alone or in any combination, in any of the embodiments contemplated herein, in order to meet the torque output requirements of the particular application. An optional reduction gearbox 172 is disposed in the outer housing 162 and configured to be driven by the impeller shaft 168 in order to increase the torque delivered to the wheel 106 (e.g., via at least one output shaft 174). Some embodiments of the reduction gearbox 172 include a plurality of output shafts. An optional flywheel 176 is disposed on the output shaft 174, and an optional clutch 178 is disposed between the output shaft 174 and the axle shaft 108 of the wheel 106. The flywheel 176 and clutch 178 combination is advantageous because it enables decoupling of the output shaft 174 from the axle shaft 108, and further enables the expanding gases 144 to accelerate the impeller 166 and the flywheel 176 during the initial burn of the propellant 134. Once the flywheel 176 is spinning and the propellant burn is stable, the clutch 178 can be engaged in order to deliver the combined torque from the impeller 166 and the flywheel 176 to the axle shaft 108.

In some embodiments, the clutch 178 is an overdriving clutch that enables the wheel 106 to spin-up upon landing without spinning the impeller 166, reduction gearbox 172, flywheel 176, or other elements of the rotary propulsion unit 160. In some embodiments, the clutch 178 is a selectable clutch configured to engage the wheel 106 or the axle shaft 108 upon receipt of an engagement signal (e.g., from the pilot) and/or automatically (e.g., when the output shaft 174 reaches a predetermined speed).

To clarify, some embodiments of the rotary propulsion unit 160 include the clutch 178, but not the flywheel 176. Other embodiments include neither the flywheel 176 nor the clutch 178, and in such embodiments the output shaft 174 is directly coupled to the axle shaft 108 (e.g., a "live axle"), or to a shaft located in the interior of the axle shaft 108, which in turn is connected to a hub of the wheel 106. Indeed, in any of the embodiments contemplated herein, the output shaft 174 or flywheel 176 may deliver torque to the wheel 106 by acting directly on the wheel 106, on the axle shaft 108, on a shaft located in the interior of the axle shaft 108, or by similar connection schemes.

Figure 1B:
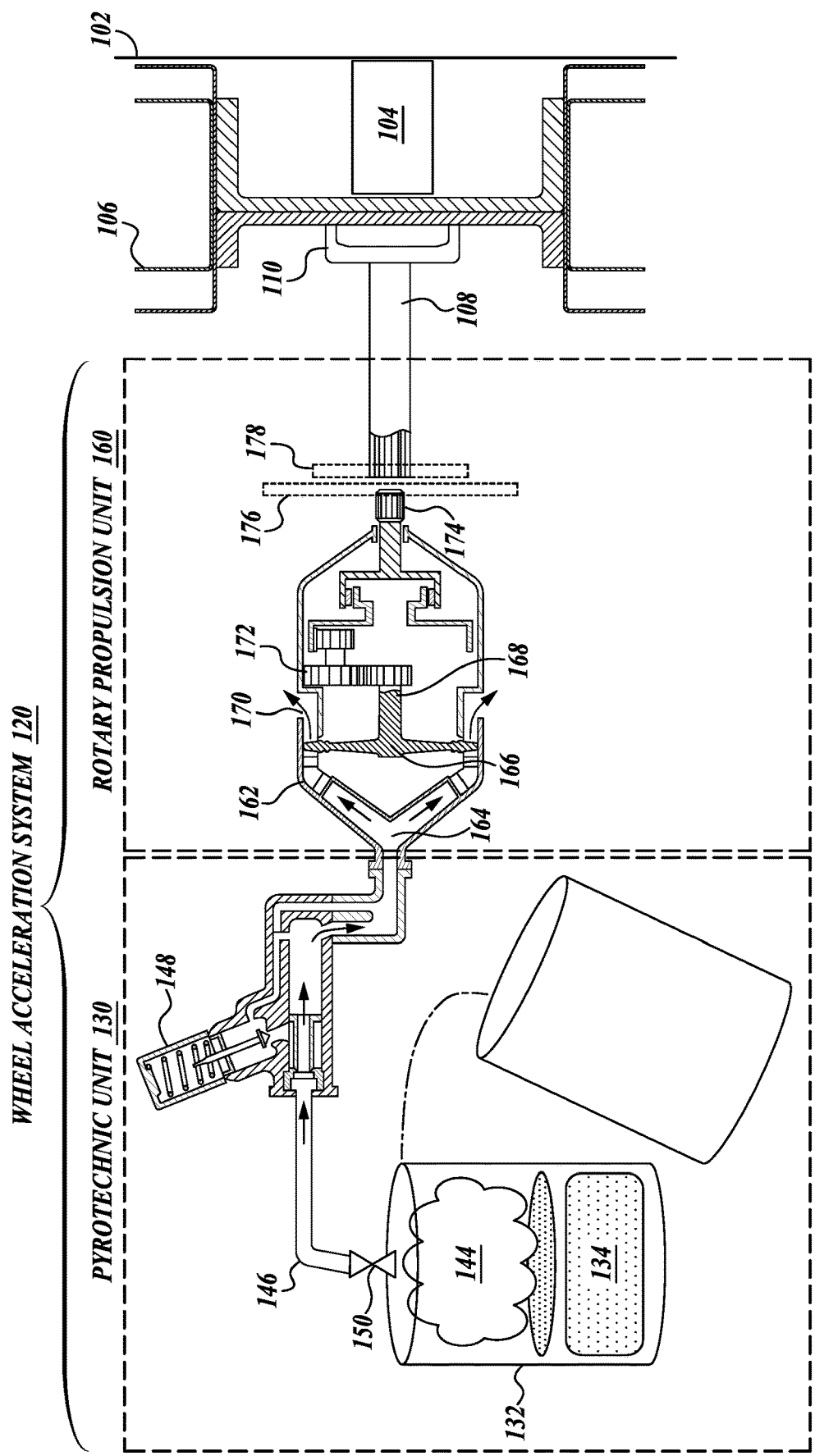
FIG. 1B is a schematic diagram of another representative wheel acceleration system in accordance with another embodiment of the present disclosure.

FIG. 1B is a schematic diagram of another wheel acceleration system 120b in accordance with another representative embodiment of the present disclosure. The wheel acceleration system 120 of FIG. 1B is similar to that of FIG. 1A except where described below. Accordingly, alike reference numerals and names have alike meanings except where described below. For brevity, certain reference numerals introduced with respect to FIG. 1A are not reintroduced with respect to FIG. 1B.

The wheel acceleration system 120 of FIG. 1B is configured to minimize flying weight of the aircraft 102 following takeoff and after depletion of the propellant. This configuration described below avoids the undesirable need for the aircraft 102 to carry the pyrotechnic cartridge 132 after depletion of the propellant 134, when it is dead weight.

Whereas the pyrotechnic cartridge 132 of FIG. 1A is configured to be manually removed from the breech 136 between flights, e.g., by a ground crewmember, the pyrotechnic cartridge 132 of FIG. 1B is configured to be jettisoned following depletion of the propellant 134. In FIG. 1B, the pyrotechnic unit 130 does not have a breech or a breech cap; rather, the pyrotechnic cartridge 132 forms its own pressure vessel which contains the propellant 134. Accordingly, the pyrotechnic cartridge 132 connects directly to the fluid circuit 146 at a gas connector 150, which can be a pyrotechnic fastener, an electromechanical connector, or the like.

Referring still to FIG. 1B, in use, the pyrotechnic cartridge 132 is ignited prior to or during takeoff, which causes the rotary propulsion unit 160 to deliver torque to the wheel 106. This process depletes the propellant 134, after which time the pyrotechnic cartridge 132 becomes dead weight. Therefore, the gas connector 150 releases (jettisons) the pyrotechnic cartridge 132 following takeoff, e.g., upon retraction of the landing gear 104 or upon receipt of a jettison signal from the pilot. As noted above, the gas connector 150 can release the pyrotechnic cartridge 132 by executing a pyrotechnic sequence (in the case of a pyrotechnic fastener), by releasing a latch (in the case of an electromechanical connector), or by a similar release process. Not only does this eliminate dead weight from the aircraft 102, but it also reduces the volume occupied by the pyrotechnic unit 130, which can enable retraction of the landing gear 104 into a landing gear bay.

The pyrotechnic wheel acceleration systems described above are unlike and superior to electric taxi ("e-taxi") systems. First, the pyrotechnic wheel acceleration systems are configured to provide much greater absolute torque and power outputs to the wheel 106, which is necessary to accelerate relatively heavy aircraft (e.g., 4,000 kg or greater) to takeoff speeds. For example, any of the wheel acceleration systems 120 described herein can be configured to provide a torque output of at least 1500 Nm to wheel 106 through the takeoff roll (either directly to the wheel 106, to the axle shaft 108, or through a similar connection scheme), resulting in a power output of at least 800 Kilowatts (e.g., 800-1,000 kW) at the end of the runway length or cartridge burn, which lasts from 5-10 seconds. Configurations providing greater torque and power outputs are contemplated. By comparison, known e-taxi systems are incapable of providing such high torque and power outputs.

A second key distinction is that the pyrotechnic wheel acceleration systems are configured to provide much greater power densities than e-taxi systems. The superior power densities of the pyrotechnic wheel acceleration systems described herein stems from reduced power source weight, reduced motor weight, absence or minimization of power controls systems, and/or absence or minimization of cooling systems. For example, pyrotechnic cartridges suitable for the wheel acceleration systems described herein (such as those based on the MXU-4A) could weigh approximately 15 kg, as compared to an approximately 140 kg supercapacitor that would be necessary to deliver a comparable power output. Further, the rotary motors described herein, such as pneumatic expansion vane motors, can weigh approximately 25% of electric motors having comparable power output. Further still, the pyrotechnic wheel acceleration systems of the present disclosure do not require cumbersome electronic control systems that would be necessary for e-taxi systems having comparable power output. Further still, given the low duty cycle and short burn times of the pyrotechnic wheel acceleration systems described herein, liquid cooling systems are not necessary.

As a result of the foregoing advantages, and the unobvious utilization of a pyrotechnic-cartridge in an aircraft system, the pyrotechnic wheel acceleration systems of embodiments of the present disclosure (including the pyrotechnic unit and the rotary propulsion unit) have a power density of at least about 8.0 kW/kg. For example, in some embodiments, the power density of the pyrotechnic wheel acceleration system can be selected from one of the following power densities: at least 9.0 kW/kg; at least 10.0 kW/kg; at least 11.0 kW/kg, at least 12.0 kW/kg; at least 13.0 kW/kg, at least 14.0 kW/kg, at least 15.0 kW/kg, or about any one of these power densities. In some embodiments, the power densities of the pyrotechnic wheel acceleration system is in a range selected from one of the following ranges of power densities: between 8.0-20.0 kW/kg; between about 9.0-18.0 kW/kg; between about 10.0-16.0 kW/kg; between 8.0-12.0 kW/kg; between 10.0-12.0 kW/kg; or between about any one of these ranges. The foregoing power densities are much higher than known assisted taxi systems.

Relatedly, embodiments of the rotary propulsion units of the present disclosure have a power density of, for example, at least 18.0 kW/kg. In some embodiments, the power density of the rotary propulsion unit is in a range between 20.0-30.0 kW/kg. In a representative embodiment, the rotary propulsion unit includes a direct drive vane motor configured to fit inside an 20 cm-diameter aircraft wheel and to generate about 426 kW (570 hp). This rotary propulsion unit weighs between about 19.0 and about 22.0 kg, and weighs about 20.6 kg in some embodiments. Additional components of the pyrotechnic wheel acceleration system (including the cartridge, connections, valves, and the like) weigh in the range of between about 18.0 kg and about 22.0 kg, and about 20.0 kg in some embodiments.

In a certain embodiment, the rotary propulsion unit has a power density of 20.6 kW/kg and the overall pyrotechnic wheel acceleration system has a power density of 10.5 kW/kg.

By comparison, in order for any e-taxi system to provide torque and power outputs as high as 1500 Nm and/or 800 kW, the immense supercapacitors, electric motors, power electronics, and cooling hardware of such an electric system would contribute to a very low power density, rendering it unsuitable for accelerating aircraft weighing at least 4,000 kg to flying or takeoff speeds.

The wheel acceleration systems described herein can be mounted in a number of different configurations to suit particular applications. For example, aircraft having wing-mounted landing gear are well-suited to the representative embodiments shown in FIGS. 2A-2C, whereas aircraft having centralized (e.g., fuselage-mounted) landing gear are well-suited to the representative embodiment shown in FIGS. 3A-3B.

In FIGS. 2A-2B, the wheel acceleration systems are mounted to inboard sides of rear wheels of the aircraft. However, this is not limiting. In variations of any of the embodiments contemplated herein, the wheel acceleration systems can alternatively be mounted to an outboard side of one wheel (such as shown in FIG. 2C). In still other embodiments, the aircraft includes a wheel acceleration system mounted to a front wheel, in addition to or alternatively to the wheel acceleration systems mounted to the rear wheels.

FIG. 2A shows a front elevation view of a representative military "fighter" type aircraft 202 having wing-mounted landing gear 204 and rear wheels 206. The aircraft 202 is equipped with two wheel acceleration systems 220, each being mounted to an inboard side of one rear wheel 206 and together forming part of a common wheel acceleration system.

FIG. 2B is as breakout view showing details of the starboard wheel acceleration system 220, according to one representative mounting configuration which is applicable to all embodiments contemplated herein. As shown, each wheel acceleration system 220 includes a pyrotechnic unit ("PU") 230 and a rotary propulsion unit ("RPU") 260. In some embodiments, each wheel acceleration system 220 has all of the components of the wheel acceleration system 120 of FIG. 1A. In other embodiments, each wheel acceleration system 220 has all of the components of the wheel acceleration system 120 of FIG. 1B. In still other embodiments, each wheel acceleration system 220 has less than all of the aforementioned components, e.g., an optional flywheel and/or optional clutch are omitted. In still other embodiments, the two wheel acceleration systems 220 are constructed identically to each other, although this is not necessary.

The PU 230 is disposed on an inboard side of the RPU 260, which is mounted over the axle shaft 208 of the wheel 206 in order to facilitate torque delivery. In some embodiments, the PU 230 and RPU 260 share a common outer housing. In some embodiments in which the PU 230 has a jettisonable pyrotechnic cartridge, the entire PU 230 is configured to be jettisoned following takeoff.

FIG. 2C is as breakout view showing details of the port-side wheel acceleration system 220, according to another representative mounting configuration, which is applicable to all embodiments contemplated herein. Whereas the wheel acceleration system 220 of FIG. 2B is mounted over the axle shaft 208 of the wheel 206, the wheel acceleration system 220 of FIG. 2C has an output shaft 274 (of the RPU 260) coupled directly to a hub or coupler 210 of the wheel 206.

The mounting configurations of FIGS. 2B-2C are representative, not limiting. For example, any of the embodiments disclosed herein may utilize one or both of the mounting schemes shown in FIGS. 2B-2C on the inboard or outboard sides of one or more wheels, including the rear wheels and/or front wheels.

Figure 3A:
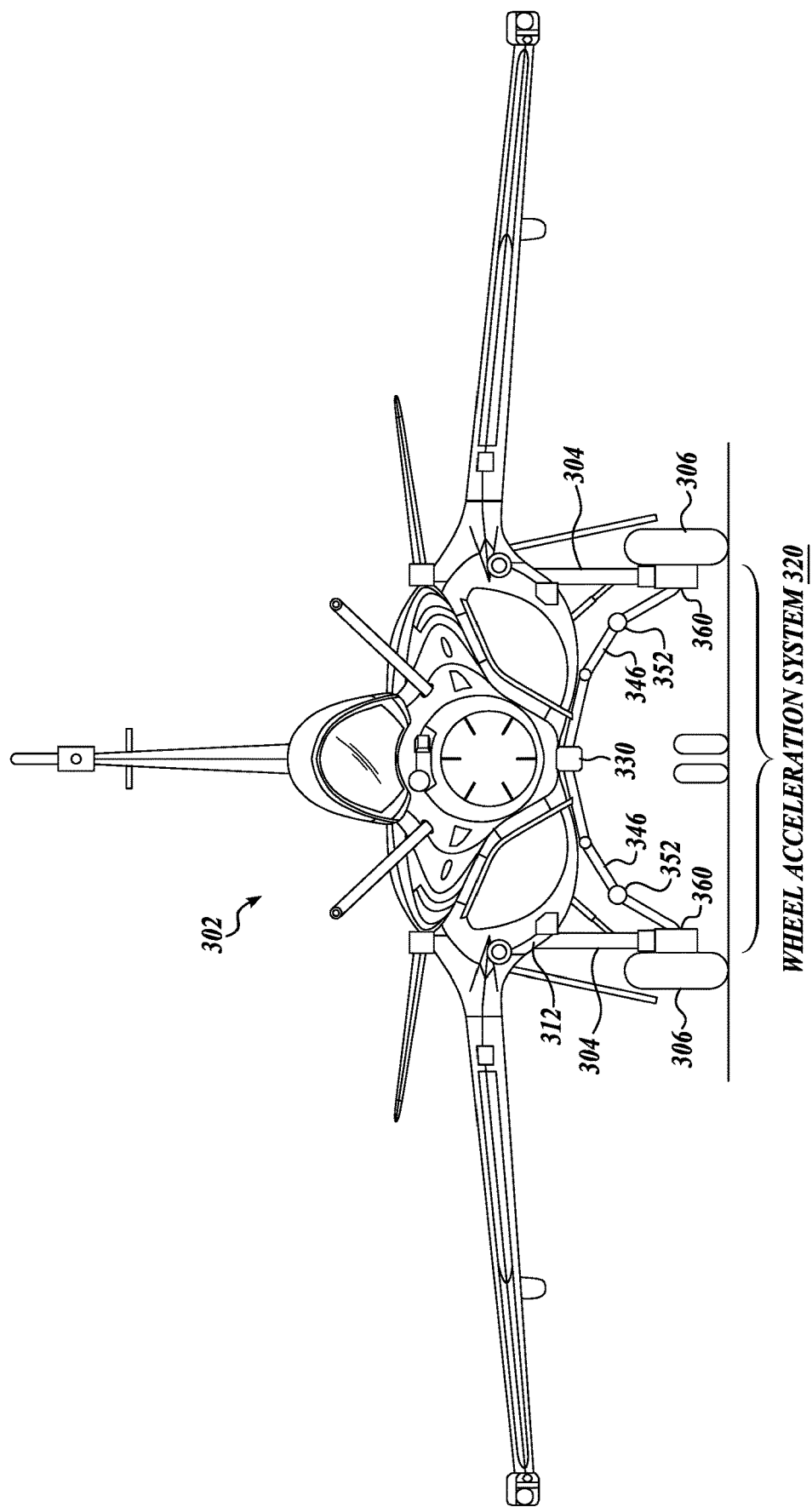
FIG. 3A is a schematic front view of another aircraft equipped with a representative wheel acceleration system in accordance with another embodiment of the present disclosure.
Figure 3B:
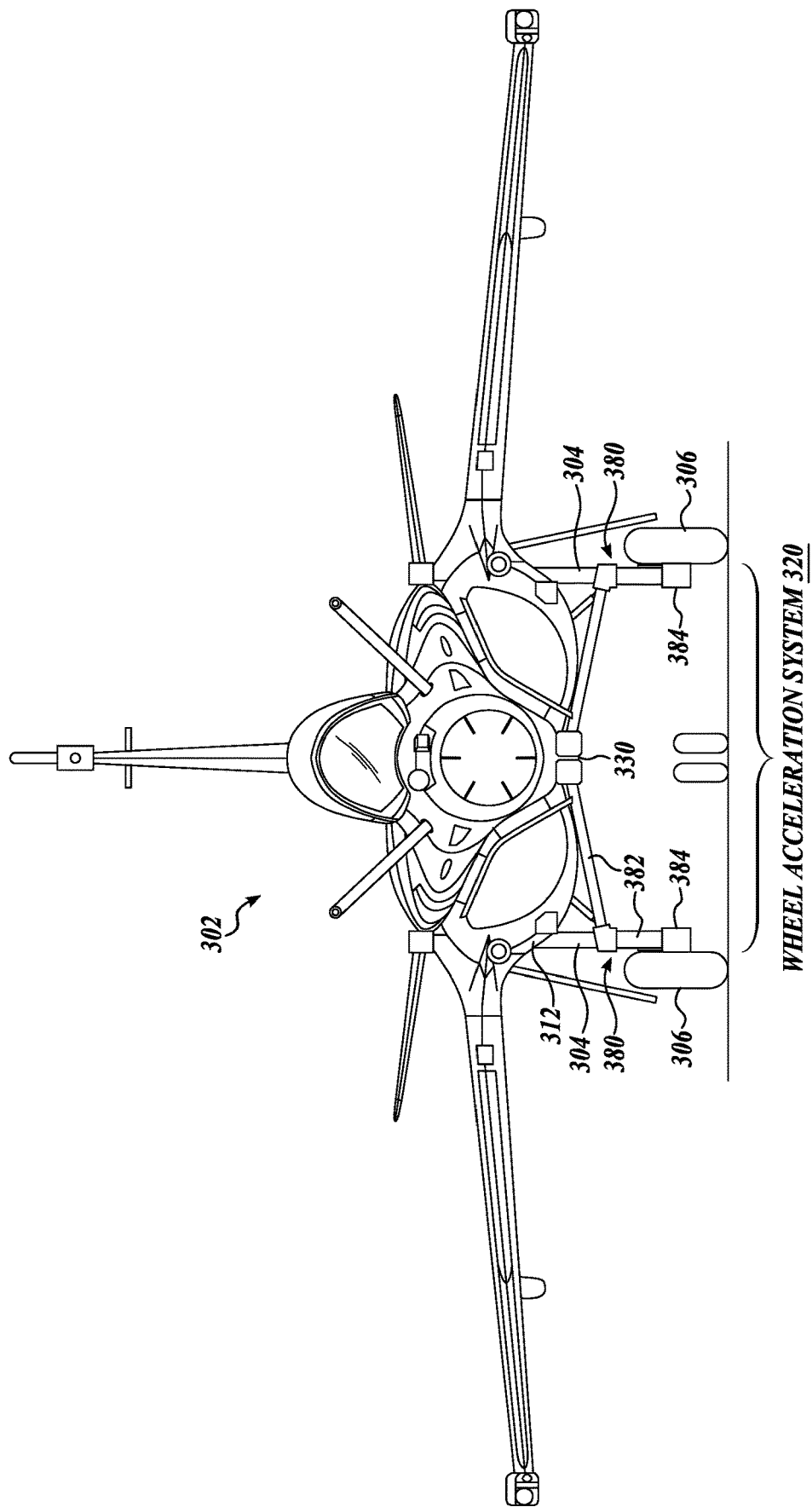
FIG. 3B is a schematic front view of the aircraft of FIG. 3A equipped with a representative wheel acceleration system in accordance with still another embodiment of the present disclosure.

FIG. 3A—3B show a front elevation view of another representative military "fighter" type aircraft 302 having centralized, fuselage-mounted landing gear 304 and rear wheels 306, which differs from the wing-mounted landing gear 204 and wheels 206 of the aircraft 202 of FIG. 2A. Such centralized and narrow landing gear systems are well-suited to wheel acceleration systems having one or more centralized components (i.e., components that serve more than one wheel 306). The centralized components can be scaled up in order to provide power and torque to a plurality of wheels 306, such as both rear wheels 306 in the illustrated embodiment. Such systems also provide weight savings as compared to embodiments with a plurality of pyrotechnic units, in which no components serve more than one wheel.

Referring to FIG. 3A, the aircraft 302 is equipped with a wheel acceleration system 320. The embodiment of FIG. 3A differs in that the wheel acceleration system 320 includes a pyrotechnic unit ("PU") 330 centrally mounted to a fuselage 312 of the aircraft 302, and two rotary propulsion units ("RPUs") 360—one mounted to the inboard side of each rear wheel 306. Each of the PU 330 and RPUs 360 comprise the components of wheel acceleration system 120 of FIG. 1A or 1B (some embodiments do not include the optional flywheel and/or clutch). Accordingly, the PU 330 has at least one gas outlet from the breech or pyrotechnic cartridge (depending on the embodiment), in order to deliver expanding gases via flexible fluid circuit 346 to each of the RPUs 360, which each deliver torque to the respective wheels 306. Although the PU 330 is shown as external to the aircraft fuselage in FIG. 3A, it is contemplated that in some embodiments, the PU 330 is stowed internally to the fuselage, for improved aerodynamics.

The flexible fluid circuit 346 enables relative movement of the PU 330 and RPUs 360, for example during articulation, retraction, and extension of the landing gear 304. In some embodiments, the flexible fluid circuit 346 comprises a continuous length of high temperature-resistant flexible exhaust ducting extending from the PU 330 to each RPU 360. In other embodiments, the flexible fluid circuit 346 comprises one or more sections of rigid exhaust piping, which are coupled together by flexible fluid circuit couplers 352 (e.g., articulating exhaust joints and the like). In some embodiments, the flexible fluid circuit 346 is routed along the landing gear struts to improve aerodynamics and to facilitate stowage of the landing gear 304 during flight. Accordingly, it is contemplated that the fluid circuit 346 may be at least partially routed internally through the fuselage and/or wing of the aircraft 302, rather than fully external to the aircraft 302.

Referring now to FIG. 3B, the aircraft 302 is equipped with a wheel acceleration system 320 having a different centralized configuration from that of FIG. 3A. While the wheel acceleration system 320 of FIG. 3B still comprises the components of wheel acceleration system 120 of FIG. 1A or 1B (some embodiments do not include the optional flywheel and/or clutch), it differs in that it includes a centrally-mounted pyrotechnic unit ("PU") 330 and a centrally mounted RPU 360—both of which are mounted to the fuselage 312 of the aircraft 302. Although the PU 330 and RPU 360 are shown as mounted external to the aircraft fuselage in FIG. 3B, it is contemplated that in some embodiments, the PU 330 and/or RPU 360 are stowed internally to the fuselage 312, for improved aerodynamics.

Because PU 330 and RPU 360 are both configured to service both wheels 306, power is transferred from the RPU 360 to the wheels 306 via a plurality of drive shaft assemblies 380. Each drive shaft assembly 380 includes a plurality of drive shafts 382 connected by at least one drive shaft coupler 384 (e.g., universal joints, continuously variable joints, reduction gearboxes, angled gearboxes, or the like). At an upper end, each drive shaft assembly 380 is operably connected to an output shaft of the RPU 360, either directly or via a reduction gearbox. At a lower end, each drive shaft assembly 380 is operably connected to one of the wheels 306, either directly (e.g., to a hub of the wheel), via an axle shaft, via a shaft internal to the axle shaft, via one or more drive shaft couplers 384, or via similar connection scheme (as described above). In use, ignition of a pyrotechnic cartridge in the PU 330 causes the RPU 360 to deliver torque to both wheels 306 via the drive shaft assemblies 380, thus accelerating the aircraft 302.

Thus, the present disclosure provides a number of innovative wheel acceleration systems having an unobvious combination of features that are together configured to accelerate an aircraft to flying speed in connection with main engine thrust, utilizing pyrotechnic cartridge-powered rotary propulsion units, which in turn deliver high torque and power output to one or more aircraft wheels.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B." Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A wheel acceleration system configured to apply a motive force to a wheel mounted to a landing gear of an aircraft, the wheel acceleration system comprising:
   a pyrotechnic unit configured to generate expanding gases by combusting a propellant;
   a rotary propulsion unit pneumatically coupled to the pyrotechnic unit, the rotary propulsion unit comprising an impeller configured to be driven by the expanding gases and to deliver torque to the wheel; and
   an overdriving clutch coupling the impeller to the wheel.

2. The wheel acceleration system of claim 1, wherein the rotary propulsion unit is mounted to the landing gear.

3. The wheel acceleration system of claim 2, wherein the pyrotechnic unit is mounted to the landing gear.

4. The wheel acceleration system of claim 1, wherein the impeller of the rotary propulsion unit is part of a turbine or an expansion vane motor.

5. The wheel acceleration system of claim 1, wherein the impeller is coupled to the wheel via a reduction gearbox.

6. The wheel acceleration system of claim 1, wherein the rotary propulsion unit is contained within an outer housing configured to mount to the landing gear.

7. The wheel acceleration system of claim 1, further comprising a flywheel coupled with the rotary propulsion unit, the flywheel being configured to selectively engage the aircraft wheel.

8. The wheel acceleration system of claim 1, wherein pyrotechnic unit and the rotary propulsion unit are contained in a common outer housing.

9. The wheel acceleration system of claim 1, wherein the pyrotechnic unit comprises a breech configured to receive a pyrotechnic cartridge containing the propellant.

10. The wheel acceleration system of claim 1, wherein the pyrotechnic unit is configured to jettison a pyrotechnic cartridge containing the propellant after takeoff.

11. The wheel acceleration system of claim 10, wherein the pyrotechnic cartridge is a pressure vessel and the pyrotechnic unit is configured to jettison the pyrotechnic cartridge by releasing a gas connector that couples the pyrotechnic cartridge to the pyrotechnic unit.

12. The wheel acceleration system of claim 1, further comprising a second rotary propulsion unit comprising a second impeller configured to be driven by the expanding gases of the pyrotechnic unit, the second impeller configured to be driven by the expanding gases and to deliver torque to a second wheel of the aircraft.

13. The wheel acceleration system of claim 12, wherein the pyrotechnic unit is mounted to a fuselage of the aircraft, the rotary propulsion unit is mounted to the landing gear, and the second rotary propulsion unit is mounted to a second landing gear of the aircraft.

14. The wheel acceleration system of claim 13, wherein the pyrotechnic unit is configured to deliver the expanding gases to the rotary propulsion unit via a first fluid circuit and to the second rotary propulsion unit via a second fluid circuit.

15. The wheel acceleration system of claim 1, wherein the pyrotechnic unit and the rotary propulsion unit are mounted to a fuselage of the aircraft or to the aircraft landing gear.

16. The wheel acceleration system of claim 15, wherein the rotary propulsion unit is configured to rotatably drive the wheel and a second wheel of the aircraft with a plurality of drive shaft assemblies.

17. The wheel acceleration system of claim 1, wherein the rotary propulsion unit is configured to deliver a torque output of at least 1500 Nm to the wheel.

18. The wheel acceleration system of claim 1, wherein the rotary propulsion unit is configured to deliver a power output of at least 800 Kilowatts to the wheel.

19. An aircraft landing gear, comprising the wheel acceleration system of claim 1.

* * * * *